United States Patent [19]

Brachthäuser et al.

[11] 4,187,071
[45] Feb. 5, 1980

[54] METHOD FOR THE TREATMENT OF FINELY GRAINED MATERIAL, PARTICULARLY FOR THE PRECALCINING OF CEMENT

[75] Inventors: Kunibert Brachthäuser, Bensberg; Hubert Ramesohl, Bensberg-Refrath; Klaus Beisner, Hoffnungsthal; Horst Herchenbach, Troisdorf, all of Fed. Rep. of Germany

[73] Assignee: Klöckner-Humboldt=Deutz Aktiengesellschaft, Fed. Rep. of Germany

[21] Appl. No.: 833,231

[22] Filed: Sep. 14, 1977

Related U.S. Application Data

[62] Division of Ser. No. 665,327, Mar. 9, 1976, Pat. No. 4,066,470.

[30] Foreign Application Priority Data

Mar. 10, 1975 [DE] Fed. Rep. of Germany ....... 2510312

[51] Int. Cl.² ............................................. F27B 15/00
[52] U.S. Cl. .................................. 432/106; 106/100; 432/58
[58] Field of Search ................... 432/14, 58, 103, 105, 432/106, 99; 106/100; 34/57 R, 57 A, 10

[56] References Cited

U.S. PATENT DOCUMENTS

| | | | |
|---|---|---|---|
| 3,881,862 | 5/1975 | Nishida et al. | 432/106 |
| 3,887,326 | 6/1975 | Townley | 432/99 |
| 3,904,353 | 9/1975 | Bosshard et al. | 432/106 |
| 3,910,754 | 10/1975 | Weber et al. | 432/106 |
| 3,940,236 | 2/1976 | Weber et al. | 432/106 |
| 3,958,919 | 5/1976 | Kjell-Berger | 432/99 |
| 3,986,818 | 10/1976 | Denssner et al. | 432/14 |
| 4,002,420 | 1/1977 | Christiansen | 432/106 |
| 4,025,295 | 5/1977 | Touborg | 432/106 |
| 4,060,375 | 11/1977 | Weber et al. | 432/106 |

*Primary Examiner*—Henry C. Yuen
*Attorney, Agent, or Firm*—Hill, Van Santen, Steadman, Chiara & Simpson

[57] ABSTRACT

A method and mechanism for calcining cement wherein the material is preheated in a precalcining zone and a vertical conduit leads heated discharge gases upwardly from a main calcining furnace, a supply of fuel and a supply of oxygen is fed to a preoxidation zone beneath the precalcining zone and raw material is fed into an admixing area above the burner with a deflector preventing particles from falling down into the preoxidation zone with the fuel being partially oxidized so that controlled heating and controlled oxidation occurs in the precalcining zone.

3 Claims, 3 Drawing Figures

METHOD FOR THE TREATMENT OF FINELY GRAINED MATERIAL, PARTICULARLY FOR THE PRECALCINING OF CEMENT

This is a division of application Ser. No. 665,327, filed Mar. 9, 1976, now U.S. Pat. No. 4,066,470.

BACKGROUND OF THE INVENTION

The invention relates to a method and mechanism for the thermal treatment of pulverulent or finely grained material, and particularly for the calcining of cement in several steps whereby the raw material is first preheated in a precalcining step and finally the calcining is completed in a furnace. More particularly, the invention relates to improvements in the precalcining step in cooperation with the calcining step so that controlled heating and controlled oxidation takes place in precalcining as the material is admixed with partially oxidized fuel and oxygen.

In the production of cement, a conventional process involves calcining and sintering which take place consecutively in a rotary kiln in two separate portions so that the rotary kiln solely performs a sintering function, and another part connected in series operates on added calcining material particles in an airstream. This is shown, for example, in German Pat. No. 446,029. In accordance with this principle, the precalcining device is a cyclone heat exchanger, and permits the rotary kiln to be made smaller in size. In the rotary kiln, because of the dynamic stress that occurs with rotation, a more expensive structure is involved than with a heat exchanger that does not rotate but is subjected only to static load. Thus, if it is possible to reduce the size of the rotary kiln, this brings about a savings in cost of construction and also a savings in space required, and this can be accomplished by a more effective improved precalcination structure and operation.

For such precalcination, a heat supply is provided in a separate special combustion zone. In this combustion zone, it is important that a predetermined maximum temperature must not be exceeded because excessive temperatures will result in the danger of caking of the material interfering with the normal operation of the device. Attempts have been made to provide separate special combustion chambers which have been relatively expensive from a structural standpoint, and these are positioned between the preheater and the rotary kiln functioning for sintering wherein a special complex intermixture of raw material and fuel is attempted to prevent peaks in temperature, and such chambers insuring this function have been found to be expensive in construction and not wholly satisfactory.

It has also been proposed to carry out precalcination in the gas conduit leading to the actual preheater as is shown in German Laid Open Specifications Nos. 2,324,519 and 2,324,565. In order to prevent the possible overheating and resultant disadvantages, in this type of device the fuel is mixed with raw material to be calcined before the fuel is distributed into the heated discharge gas stream emerging from the rotary kiln. The mixture takes place at a location where the concentration of raw material is so high that no combustion occurs. Such a concentration of raw material at predetermined points of the gas conduit results in a concentration of raw material which is relatively low at other points. A supply of fuel at these low concentration points lead to high peaks of temperature with resultant disadvantages.

With the present invention, the aforementioned difficulties have been overcome in a simplified and reliable way. A reliable ignition of the combustible fuel as well as a uniform combustion at relatively low temperatures has been insured. The fuel is ignited and partially oxidized in precombustion step and combined with the hot oxygen containing gas stream from the furnace, and this mixture is admixed with a substantial part of the raw material to be treated which is further oxidized in a precalcination zone. In accordance with the invention, partial oxidation first takes places with the fuel supply, and the fuel is ignited reliably and uniformly. In the first combined completely ignited and partially oxidized condition, it is admixed with the majority of the raw material to be treated. The partially oxidized fuel is there further burned in intimate mixture with the material to carry out the precalcination. In accordance with the method, a completely uniform distribution of the combustible material and the raw material take place, and delays in ignition or combustion as have occurred with methods heretofore available wherein too great a density of material present, are reliably prevented. Local overheatings are also prevented.

It is accordingly an object of the present invention to provide an improved mechanism and method for the calcination of cement wherein a smaller main calcination burner and furnace may be provided reducing the cost by diminishing the size of moving parts.

A further object of the invention is to provide an improved method and structure for precalcination of cement wherein a more uniform and a more effective precalcination takes place to improve the capacity of precalcination apparatus.

A still further object of the invention is to provide an improved precalcination arrangement wherein a more uniform mixing occurs between heated gases and oxygen and raw material, and wherein a particularly more uniform heating of the material occurs without the possibility of localized areas of high temperature occuring.

A still further object of the invention is to provide an improved arrangement wherein a partial oxidation of the fuel takes place and oxygen and partially oxidized fuel is supplied to an admixing area for uniform distribution of the fuel and oxygen through the material and the completion of combustion of the fuel and oxidation of the material to be precalcined.

In one embodiment of the invention, partial oxidation of the fuel takes place in the hot oxygen containing gas stream that is received from the calcination furnace, and thereafter the mixture of partially oxidized fuel and the gas is combined with the raw material. In this arrangement, parts of the normal oxygen containing streams of gas are used for the partial oxidation of the fuel. After the ignition and preoxidation, the mixture of partially oxidized fuel and gas is combined thoroughly with the raw material, and upon the residual burning up of the fuel, the precalcination is completed with the optimization of use of total fuel energy.

In a further embodiment, additional oxygen is supplied to the stream of gas after partial oxidation at a controlled rate. This addition of oxygen to the oxygen in the gas coming from the rotary kiln can be adjusted as desired to adapt to varying operation of the rotary kiln and varying rates of material treatment. This further enables reduction in the size of the main rotary kiln and permits accurate control of the combustion of the gases by control of the location and amount of addition of additional oxygen. In this arrangement, a flame guidance structure is provided which has a separate preoxidation zone, and an admixing area for the calcination zone wherein the calcination zone is optimumly positioned relative to the position of the ignition chamber, combustion chamber and burner as well as the location and direction of additional fuel supply and oxygen supply nozzles.

For carrying out of the method of the invention, the main sintering furnace or kiln is provided with a standpipe or vertical conduit provided for receiving at its lower end the furnace exhaust gases. Fuel is added in a preoxidation zone in the conduit wherein the fuel is partially oxidized with the oxygen from the exhaust gases. Material feed is supplied above the fuel feed with the distance between the fuel feed and material feed being critical so that no raw material reaches the area of fuel introduction and the fuel flow path is limited so that only partial oxidation takes place before admixing occurs. In accordance with the vertical relationship and the selected distances between fuel introduction and material feed, a completely uniform flame can develop so that an accurately adjustable temperature profile can be obtained which is not disturbed throughout the combustible material. With this arrangement even with a high material density and wherein nonuniformity and material concentration occurs, there is no resultant ignition retardation or combustion retardation which would adversely affect the quality of the precalcined product. The afterburning effect which has occured nonuniformly in installations heretofore available is reliably prevented. This arrangement also prevents material from being held up in stationary spirals and remaining in a location too long wherein overheating can occur.

In a further arrangement of the invention, a deflecting device is located between the precombustion zone and the admixing area where the raw material is added. This deflective device prevents larger particles of material from dropping downwardly and entering the fuel ignition and preoxidation area. The deflected materials are carried upwardly by the stream of gas and do not reach the oxidation chamber. This prevents particles of material from disturbing the preoxidation and flame distribution.

In another embodiment of the invention, a combustion chamber is provided for a partial oxidation of fuel with the combustion opening into the gas conduit leading from the rotary kiln. In this arrangement, a partial preoxidation occurs in the separate chamber, and adjustment of fuel and oxygen supply can be made in accordance with the requirements of flame expansion and speed of ignition. Such a chamber makes it possible for completely uniform preoxidation, and the development of a temperature profile favorable to the thermal process required in the precalcination zone. This separate combustion chamber may be arranged concentrically about the gas conduit and enables a uniform distribution peripherally into the gas conduit.

It is contemplated that a preferred distance between the fuel feed and the preoxidation zone and material supply in the admixing area is equal to one-fourth of the theoretical flame length. Thus, the material introduction in the admixing area takes place in the most favorable hot part of the combustion. The distances between one-fourth of the theoretical flame length and not greater than the flame length are preferably much closer to one-fourth of the flame length so that the combustion of the flame is not so cooled by the stream of cooler raw material flowing into the oxidizing flame so that unequal or overheating will not occur.

Further objects, advantages and features will become more apparent with the teaching of the principles of the invention in connection with the disclosure of the preferred embodiments in the specification, claims and drawings in which:

DRAWINGS

DESCRIPTION

Figure 1:
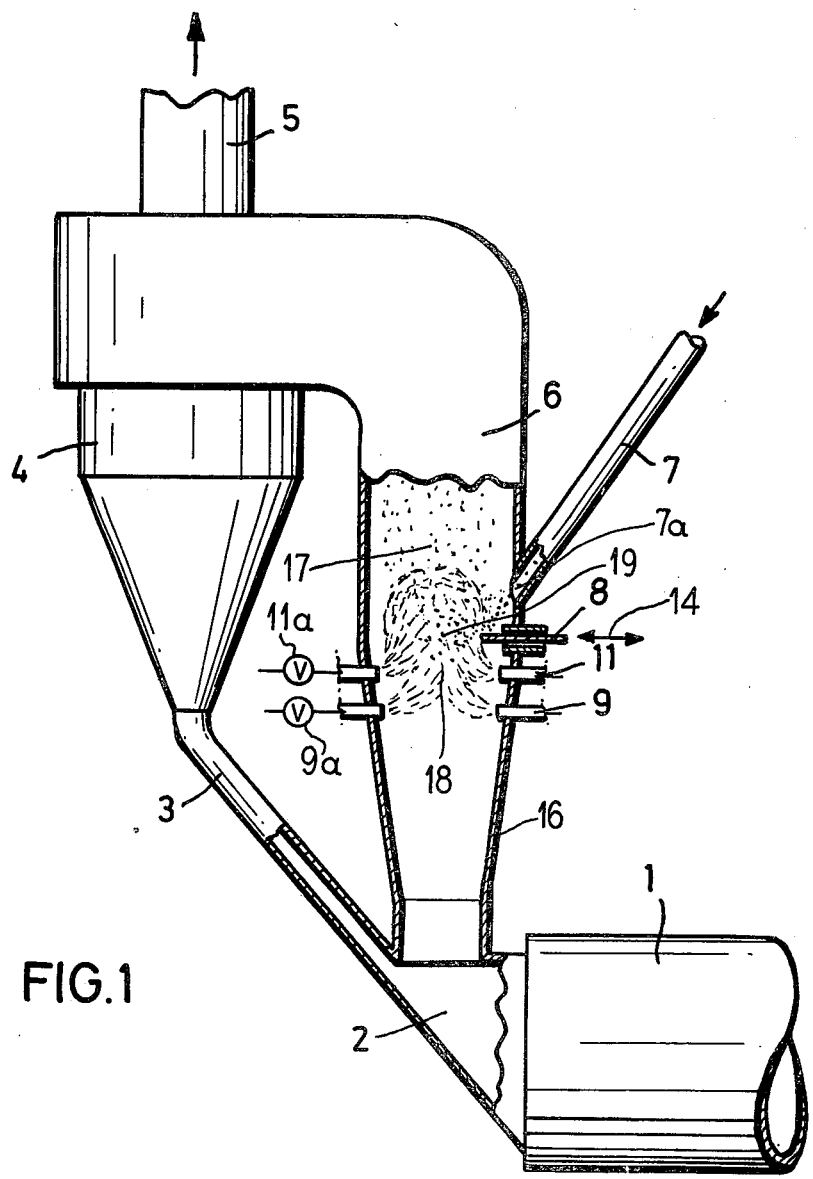
FIG. 1 is an elevational view shown partially in section, and shown somewhat schematically of a mechanism operating in accordance with the principles of the present invention.
Figure 2:
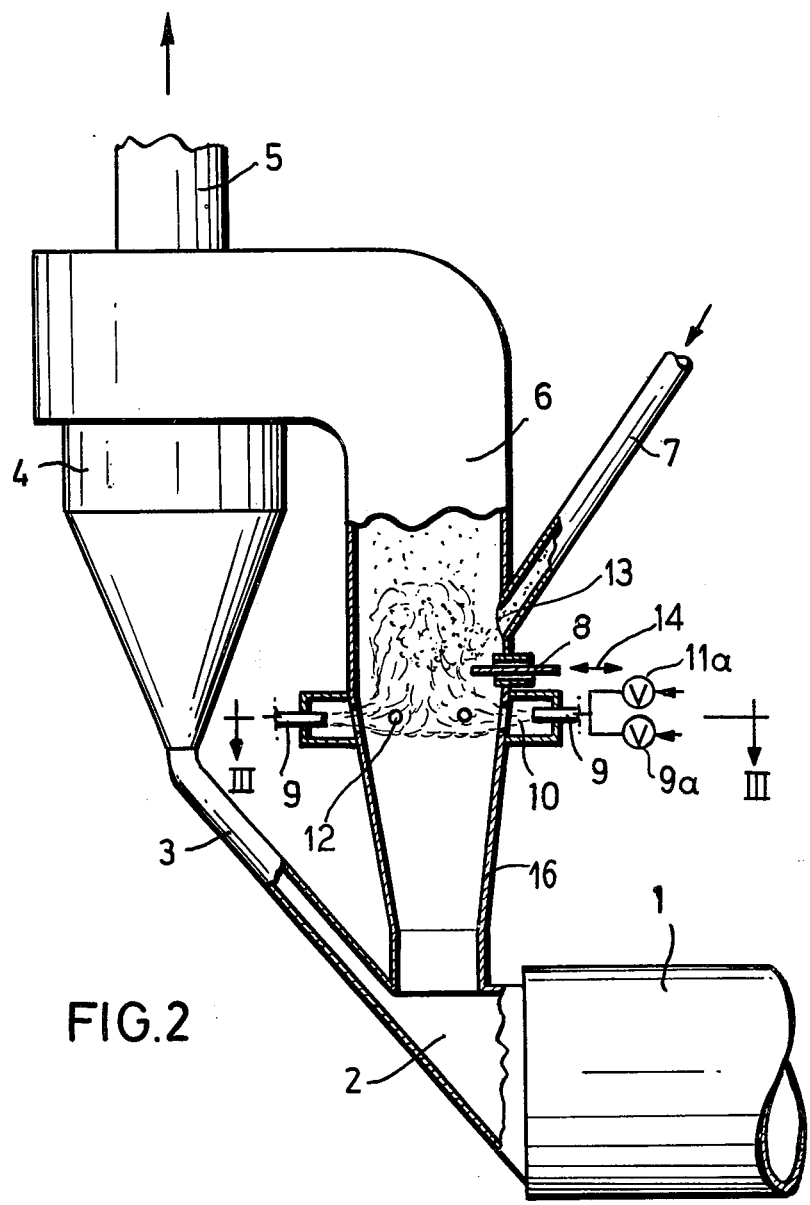
FIG. 2 is a somewhat schematic elevational view with portions in section showing another form of the invention.
Figure 3:
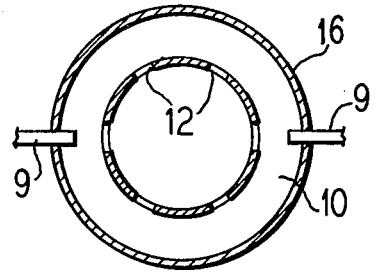
FIG. 3 is a somewhat schematic horizontal sectional view taken substantially along III—III of FIG. 2.

In FIGS. 1 and 2 which show separate embodiments, similar parts are indicated with like numerals. In FIG. 1, a main rotary kiln or furnace 1 is shown with portions omitted. The rotary kiln will have means to drive it in rotation with a burner, not shown, and means for removing the fully calcined cement. Discharge gases from the rotary kiln 1 pass outwardly through the inlet chamber 2 and flow upwardly through a vertical standpipe or conduit 16. The inlet chamber 2 also receives the precalcined cement which flows down through a material feed conduit 3 from a heat exchange cyclone 4. The cyclone receives the precalcined cement which is treated in a manner which will be described. The gas outlet from the cyclone is shown at 5, and further cyclone preheater steps and devices may be provided as will be recognized by those versed in the art. The cyclone is supplied with preheated, precalcined cement through a main gas conduit 6. Raw material is supplied through an inlet material feed conduit 7.

Heated gases containing oxygen flow vertically upwardly through the vertical conduit 16, and fuel is supplied through burners 9 into a preoxidation zone 18. Here the ignited fuel is partially burned or partially oxidized and flows upwardly with additional oxygen into a precalcining zone 17. At the lower end of the precalcining zone 17 is an admixing area 19 which receives the flow of raw material through the inlet conduit 7. The flow of fuel to the burners 9 is controlled by fuel control valve 9a.

In accordance with the arrangement of FIG. 1, additional oxygen is also supplied in a controlled amount through oxygen supply lines 11 leading to the preoxidation zone 18. The flow of oxygen is controlled by valve means 11a, and regulation of the fuel and oxygen flow as a function of flow of gases upwardly through the conduit 16 and as a function of flow of material through the inlet line 7 can be controlled. These may be manually adjusted in accordance with operational values and with the furnace capacity or automatic equipment may be provided which measure flow rates and temperatures. In accordance with the invention, partial oxidation occurs in the preoxidation zone 18, and the partially oxidized burning fuel becomes thoroughly admixed with the entering raw material at the admixing zone 18 which occurs completely across the width of the conduit, but the raw material is carried upwardly by the ascending gases in the conduit 16 and is not permitted to drop downwardly in the preoxidation zone 18. To aid in this control of material flow and material mixing, a deflector device 8 is provided. This is shown preferably in the form of a laterally slidable plate which is movable laterally by hand or by an operating device shown by the arrowed line 14. Other deflecting devices may be provided which will perform the objectives, and these may be in the form of deflecting partially open grids or screens. The deflecting device functions to reliably permit the partially oxidized burning gases to flow upwardly, but to prevent heavy particles from falling directly downwardly into the preoxidation area 18. With the material flow inlet 7, shown as set at an angle to the vertical upward flow of gases, the lighter particles will tend to be deflected and distributed laterally across the conduit 16 when they enter the admixing zone, and the heavier particles will drop downwardly to be deflected laterally outwardly by the deflecting plate 8. The fuel inlets and the oxygen inlets may be diametrically opposed as illustrated, or a plurality may be provided arranged circumferentially around the preoxidation zone 18. Similarly, additional material feed inlet may be provided with deflecting plates arranged to deflect heavier particles inwardly and insure their distribution across the admixing zone 19.

In accordance with the method of the invention, exhaust gas from the rotary kiln which contains oxygen to an appreciable degree flows outwardly through the inlet chamber 2 and upwardly through the main gas conduit 6. Ignited gas flows in through the burner inlets 9 and additional oxygen is supplied in a controlled amount to influence the combustion temperatures of the flame developed and to control the degree of preoxidation which takes place. The preoxidized stream of gas after passing the deflecting plate, drags with it the raw material to be calcined, which flows inwardly through the conduit 7. The length of the flame is so adjusted and so located that the upper part of the flame at which the material is supplied at the admixing zone 19 does not exceed 1100° C. This will not result in a caking of the material being precalcined. The burners are also located relative to the inlet opening 7a for the raw material so that the vertical distance between the burners 9 and the opening 7a is such that the admixing zone 19 is equal to at least ¼ of the theoretical flame length. By this vertical spacing the material introduction takes place in the most favorable hot part of the combustion zone. The distance should be somewhere near ¼ of the theoretical flame length and less than the total flame length so that the combustion is cooled by the entering cooler material which prevents overheating of the material.

In the arrangement of FIG. 2, a separate combustion chamber 10 is provided preferably situated annularly around the vertical conduit 16. In the combustion chamber, ignition of the fuel takes place, and a partial oxidation occurs. With this arrangement, it is insured that the fuel is uniformly ignited and partially burning before being discharged into the preoxidation zone 18. Circumferentially spaced openings such as 12 lead from the combustion area 10 into the conduit 16. Gas is supplied through the burner 9 from a line controlled by gas flow control valve 9a. Oxygen is also supplied through a line controlled by a valve 11a to obtain the initial ignition of the combustible fuel.

Thus, it will be seen that we have provided a method and structure which operates in accordance with the principles set forth above and achieves the advantage and objectives outlined.

We claim as our invention:

1. A structure for thermally treating material such as for the calcining of cement, comprising in combination:
   a rotary kiln,
   at least one cyclone separator heat exchanger having a solids discharge and an inlet gas conduit,
   a standpipe connecting said rotary kiln to the solids discharge of said cyclone separator,
   means for directing a controlled amount of fuel and oxidizing gas into said standpipe to provide a spatially limited preoxidation zone therein,
   means in said standpipe providing an admixing zone immediately above said preoxidation zone,
   feed means for injecting raw material directly into said admixing zone for admixture with the partially oxidized gas emanating from said preoxidation zone,
   means in said standpipe providing a precalcining zone between said admixing zone and the inlet gas conduit of said cyclone separator,
   movable deflector means between said preoxidation zone and said precalcining zone, said deflector means being sufficiently porous to adjustably permit partially oxidized gases to flow from said preoxidation zone into said precalcining zone but preventing heavy particles from falling from said feed means into said preoxidation zone, and
   means for discharging precalcined particles from said cyclone separator into said rotary kiln.

2. A structure for thermally treating material as specified in claim 1, wherein said movable deflector means includes means for adjusting the lateral position of the deflector means between said preoxidation zone and said precalcining zone.

3. A structure for thermally treating material such as for the calcining of cement constructed in accordance with claim 1:
   wherein a combustion chamber annularly surrounds said preoxidation zone.

* * * * *